United States Patent [19]

Wong

[11] Patent Number: 4,698,394
[45] Date of Patent: Oct. 6, 1987

[54] REACTIVE STYRENE POLYMERS

[75] Inventor: Pui K. Wong, Katy, Tex.

[73] Assignee: Shell Oil Company, Houston, Tex.

[21] Appl. No.: 812,431

[22] Filed: Dec. 23, 1985

[51] Int. Cl.[4] .................... C08F 12/32; C08F 212/32; C08F 279/02
[52] U.S. Cl. .................... 525/289; 525/315; 525/316; 526/281; 526/284
[58] Field of Search ............... 526/281, 284; 525/289

[56] References Cited

U.S. PATENT DOCUMENTS

| | | | |
|---|---|---|---|
| 3,497,483 | 2/1970 | Ketley | 525/326.1 |
| 4,230,836 | 10/1980 | Canterino | 525/332 |
| 4,309,515 | 1/1982 | Corley | 525/316 |
| 4,540,763 | 9/1985 | Kirchhoff | 526/281 |
| 4,642,329 | 2/1987 | Kirchhoff et al. | 526/284 |

OTHER PUBLICATIONS

"Styrene Plastics", Kirk–Othmer Encyclopedia of Chemical Technology, vol. 19, pp. 85–134, 1939.
Chemical Abstracts 72653f; vol. 82, 1975.
Research Disclosure 268008.
Boekelheide et al., Tetrahedron Lett. 1978, 4245–8.
Boekelheide, Topics in Current Chem. 1983, 113, 100–4.
Perkins et al., Angew. Chem. Int. Ed. Engl. 1978, 17(8), 615–6.
Ewing et al., J. Chem. Soc., Chem. Commun. 1979, 207–8.
Gray et al., J. Am. Chem. Soc. 1978, 100, 2892-2.
Harruff et al., J. Am. Chem. Soc. 1978, 100, 2893–4.
Aalbersberg, Tetrahedron Lett. 1979, 22, 1939–42.
Hubert et al., J. Chem. Soc. 1965, 3160–9.

Primary Examiner—Wilbert J. Briggs, Sr.

[57] ABSTRACT

Solid copolymers of a monovinyl aromatic compound and an olefinic benzocyclobutene monomer of the formula

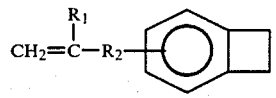

where $R_1$ is hydrogen or $CH_3$ and $R_2$ is $-(CH_2)_n-$ where n is 0 to 6 are claimed. Such copolymers can be easily crosslinked at temperatures above about 200° C., resulting in better solvent resistance and higher Tg. Also claimed are copolymers with other monomers such as acrylonitrile and associated graft copolymers, such as HIPS and ABS copolymer.

19 Claims, No Drawings

REACTIVE STYRENE POLYMERS

FIELD OF THE INVENTION

The present invention relates to polymers of monoalkenyl arenes or poly(vinyl aromatics). In particular the present invention relates to copolymers of monoalkenyl arenes and certain benzocyclobutene derivatives.

BACKGROUND OF THE INVENTION

Over the years a large number and variety of important polymers have been developed with styrene monomers. Amorphous homopolymers of styrene prepared via free-radical polymerization are still the most important polymers. Subsequently other forms of polystyrene have been prepared. These include Ziegler-Natta isotactic crystalline polystyrene and anionic polystyrene with an $M_w/M_n$ in the range of 1.05-1.10 with controlled molecular weight. Alkylated styrenes, such as alphamethyl styrene and paramethylstyrene have also been of interest for certain end uses. See, e.g., "Styrene Plastics", Kirk-Othmer Encyclopedia of Chemical Technology, Volume 19, pages 85-134 (Interscience Publishers, 1969).

It has long been known that the brittle nature of polystyrene can be overcome by incorporating a minor amount of rubber. The rubber is largely incompatible with the polymeric vinyl compounds resulting in a two-phase system comprising a dispersed rubber phase and a poly(monovinyl aromatic) matrix. See, e.g. U.S. Pat. No. 4,309,515. These graft copolymers are commonly termed high impact polystyrene or HIPS.

Acrylonitrile copolymers with styrene (SAN) are another large group of styrene polymers. These copolymers are transparent, and, in comparison to polystyrene, more solvent- and craze-resistant and relatively tough. They also constitute the rigid matrix phase of the ABS (acrylonitrile-butadiene-styrene) copolymers which are of common usage.

Styrene has long been copolymerized with butadiene to form both rubbers (SBR) and toughened plastics.

Other copolymers with styrene include α-methylstyrene copolymers, p-methylstyrene copolymer (see e.g. U.S. Pat. No. 4,230,836), methyl methacrylate copolymer, maleic anhydride copolymer and many more.

What has now been found is a new comonomer that can be copolymerized with styrene in the above-type of polymers, resulting in a new set of polymers having improved properties.

SUMMARY OF THE INVENTION

The present invention broadly relates to a copolymer of a monoalkenyl arene and a benzocyclobutene monomer. In particular, the present invention relates to a random copolymer of a monoalkenyl arene monomer (and other monomers or polymers) and an olefinic benzocyclobutene monomer of the formula:

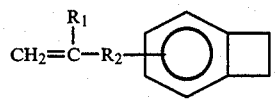

where $R_1$ is hydrogen or $CH_3$ and $R_2$ is $-(CH_2)_n-$ where n is 0 to 6, said composition having been prepared by polymerization in the presence of a catalyst at a temperature of less than about 150° C., said copolymer having a benzocyclobutene content of between about 0.01 mole percent and 10 mole percent.

ADVANTAGES OF THE INVENTION

The polymers of the present invention may be cross-linked at elevated temperatures (above about 200° C.) resulting in improved solvent resistance (insolubility in certain solvents) and a higher glass transition temperature (Tg). Further, the polymers of the present invention may be functionalized via a Diels-Alder reaction, resulting in polymers having improved interfacial adhesion.

DETAILED DESCRIPTION OF THE INVENTION

There are two key components for the present invention—one is a monoalkenyl arene compound (or monovinyl aromatic compound) and the other is an olefinically unsaturated benzocyclobutene monomer.

The monoalkenyl arene or monovinyl aromatic compounds are those having the vinyl radical, i.e. ethylenically unsaturated radical, attached directly to a carbon atom of the aromatic nucleus.

Styrene is the preferred monovinyl aromatic compound. Examples of other compounds applicable herein are the alkyl and dialkyl derivatives of styrene such as the dimethylstyrenes, p-methylstyrene, ethylstyrenes, isopropylstyrenes, butyl-styrenes, etc., the halogen derivatives of styrene, for example, chloro- and dichlorostyrene and the mono- and dibromostyrenes and alkylhalostyrenes as well as mixtures of these compounds with styrene or with each other. Alphamethylstyrene may be substituted in a minor amount, for example 2 to 30% by weight, preferably from about 5 to 25% in the total composition for a portion of the monovinylaromatic monomer to improve properties of the interpolymers such as heat distortion temperature.

The key aspect of the present invention involves the incorporation of a particular benzocyclobutene monomer in the polymerization process and the product. The olefinic benzocyclobutene monomers employed herein have the general formula:

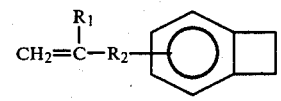

where $R_1$ is hydrogen or a $CH_3$ radical and $R_2$ is $-(CH_2)_n-$ where n is 0 to 6. Preferably, $R_1$ is H and n is 0 to 2. A preferred group of olefinic benzocyclobutene monomers includes:

| Monomer | Abbreviation |
| --- | --- |
| 4-(3-butenyl)benzocyclobutene | 4BBC |
| 3-(3-butenyl)benzocyclobutene | 3BBC |
| 4-allylbenzocyclobutene | 4ABC |
| 3-allylbenzocyclobutene | 3ABC |
| 4-vinylbenzocyclobutene | 4VBC |
| 3-vinylbenzocyclobutene | 3VBC |
| 4-isopropenylbenzocyclobutene | 4IBC |
| 3-isopropenylbenzocyclobutene | 3IBC |

The first six monomers cited above are more preferred with 4VBC being most preferred.

As shown in Illustrative Embodiment I, the thermal electrocyclic ring-opening of such benzocyclobutene monomers is the key to their particular usefulness in the present invention. Such monomers should have very good stability up to at least 100° C. ($t_{\frac{1}{2}}=12$ years at 100° C. for benzocyclobutene) and high reactivity at elevated temperature ($t_{\frac{1}{2}}=1.5$ minutes at 250° C. for benzocyclobutene).

The mixture of the monoalkenyl arene monomer and benzocyclobutene monomer may be polymerized by themselves or with other copolymerizable monomers. In general the polymerization conditions appropriate to styrene will be appropriate herein, as long as the polymerization temperature is maintained below about 150° C. (in order not to prematurely "activate" the benzocyclobutene monomer). Thus, polymerization may be effected under bulk conditions or in solution, suspension or emulsion techniques comparable to those used for styrene polymerization. The polymerization catalysts may be of the free radical or anionic types. Suitable free radical initiators include di-tertiary butyl peroxide, azobis(isobutyronitrile), di-benzoyl peroxide, tertiary butyl perbenzoate, di-cumyl peroxide and potassium persulfate. Anionic initiators are generally of the formula RMy where R is organo, mono- or polyvalent and may be alkyl, alkenyl, aryl, aralkyl, and alkaryl, and may contain from 1 to about 50 carbon atoms, and y is 1 to 4, and preferably 1 or 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, ethyl potassium, and so forth may be used in this reaction. Branched chain polymers may be obtained by using multifunctional initiators, for example, 1,3,5-trilithiocyclohexane and 1,4,7,10-tetrapotassiodecane. In the anionic polymerization each molecule of the initiator starts one anionic polymer chain; multiple anions can permit addition of secondary chains to the main chain. Stereospecific catalysts can also be used to advantage. Such catalysts are generally of the well known Ziegler type, comprising a transition metal of Group 4A, 5A, 6A or 7, in a valence state lower than its maximum in combination with an organometallic compound of Group 2 or 3.

Among the reducible transitional metal compounds suitable for the purpose of this invention are the heavy metal, inorganic compounds such as halide, oxyhalides, complex halides, hydroxides, and organic compounds such as alcoholates, acetates, benzoates, and acetyl acetonates, of the requisite metals. Such metals include titanium, zirconium, hafnium, thiorium, uranium, vanadium, niobium, tantalum, chromium, molybdenum, tungsten and iron. The metal halides, particularly the chlorides are generally preferred. Titanium, zirconium, vanadium are the most active metals. The following heavy metal compounds are readily reducible: titanium tetrachloride, titanium tetrabromide, zirconium tetrachloride, vanadium tetrachloride, and zirconium acetylacetonate.

The reduction may be effected in any suitable manner, for example, by reduction with hydrogen or aluminum. Titanium tetrachloride can be readily reduced to titanium trichloride by reduction with hydrogen, aluminum or titanium metal. Suitable reduction methods are well known in the art and are described, for example, in U.S. Pat. No. 3,362,940.

The other component of the Ziegler catalyst system is at least one organometallic compound of a metal of Groups 2 or 3. These compounds will have at least one hydrogen radical, i.e., alkyl, cycloalkyl, aralkyl, alkaryl, or aryl, attached of the metal through a carbon atom. The other substituents in the organometallic compound can be hydrocarbon radicals, halogen radicals, alkoxy, amino, hydrogen, etc., or combinations thereof. Nonlimiting examples of the organometallic compounds are triethylaluminum, tripropylaluminum, dipropylzinc, triisobutylaluminum, diethylmagnesium, diphenylaluminum chloride, cyclohexyl-ethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromoaluminum hydride, dipropylaluminum hydride, propyl zinc hydride, ethylmagnesium hydride, and methoxyaluminum diethyl. Mixtures of two or more organometallic compounds can be used.

The catalyst can be formed by methods well known in the art. Thus, for example, it can be made by charging the components separately to the polymerization zone or they may be combined immediately prior to entry into the zone.

As previously mentioned, the polymerization may be carried out in bulk, in solution, in suspension or in emulsion. Solution polymerization will generally employ inert hydrocarbon solvents such as toluene, benzene, cyclohexane, or ethyl toluene. Suspension polymerization is generally carried out in an aqueous medium comprising water and suspending agents such as calcium phosphates, polyvinyl alcohol, hydroxyethyl cellulose or sodium polyacrylates. Suitable suspension polymerization techniques will be comparable to those used with styrene monomer, which are well known in the art and described, for example, in U.S. Pat. No. 2,715,118. Emulsion techniques also will be comparable to those used for styrene, using an aqueous medium with the addition of suitable surfactants. Catalysts will normally be of the free-radical type, for example, a combination of butyl peroxide and tertiary butyl perbenzoate.

The polymerization conditions will generally be similar to those used for styrene. Thus, temperatures will generally be in the range of −80° to +150° C., preferably 0° C. to 150° C.

The polymerizable mixture may also be copolymerized with other monomers. The conditions for the copolymerization will, in general, be similar to those used for polymerizing the mixture by itself and for copolymerizing styrene. Thus, initiators, temperatures, pressures, solvents, and recovery processes will be similar to those previously described. The types of copolymer produced may include random and graft copolymers. The preparative procedures will be those appropriate to the type of copolymer in question. In general the monoalkenyl arene content will be above 60% weight for such copolymers.

Random copolymers may be made with a wide range of comonomers including other vinyl monomers such as alpha-methyl styrene, acrylates including methyl acrylate, ethyl acrylate, methacrylates including methyl methacrylate, acrylonitrile, olefins especially diolefins such as butadiene, isoprene, chloroprene and mono olefins such as ethylene and propylene.

One class of random copolymers are the random copolymers with butadiene. They may be produced by methods similar to those used in the manufacture of GR-S synthetic rubber and described, for example, in "Synthetic Rubber", Ed. Whitby et al, John Wiley, New York, 1954.

The copolymers with acrylonitrile are another class of copolymers. They have a low affinity for hydrocarbons, especially as compared to the homopolymer. The affinity for hydrocarbons can therefore be controlled by copolymerizing the monomer mixture with varying amounts of acrylonitrile. Generally, the amount of acrylonitrile will be from 15 to 35%, preferably about 30% by weight, although lower amounts, e.g., about 10% of the comonomer will effect useful changes in the properties of the polymer.

Another class of copolymers are the high impact copolymers. These are generally graft copolymers produced by grafting units derived from the polymerizable mixture onto a backbone polymer which is generally of a rubbery nature. Suitable backbone polymers include polybutadiene, poly(dimethyl butadiene), polyisoprene, polychloroprene and other synthetic rubbers such as the styrene-butadiene rubbers (SBR) ethylene-propylene rubbers (EPR), ethylene-propylene-diene elastomers (EPDM), polyacrylates, nitrile rubbers and copolymers with other aromatic monomers including vinyl toluene. The backbone will generally comprise 2 to 25 percent by weight of the high impact copolymer, preferably 3 to 10 percent by weight. Normal techniques, e.g. grafting, comparable to those used for making high impact polystyrenes are useful; they are well known in the art and referred to, for example, in U.S. Pat. No. 2,694,692 and British Pat. No. 1,054,301.

A key aspect of the present invention is the amount of benzocyclobutene monomer incorporated in the polymer. The relative amounts of benzocyclobutene monomer and monoalkenyl arene monomer depends upon the desired crosslink density or functionality. The table below shows suitable ranges in mole percent:

|  | Preferred | More Preferred |
| --- | --- | --- |
| Benzocyclobutene monomer | 0.01 to 20 | 0.1 to 10 |
| Monoalkenyl arene monomer | 99.99 to 80 | 99.9 to 90 |
| TOTAL | 100 | 100 |

To illustrate the instant invention, the following illustrative embodiments are given. It is to be understood, however, that the embodiments are given for the purpose of illustration only and the invention is not to be regarded as limited to any of the specific materials or conditions used in the specific embodiments.

ILLUSTRATIVE EMBODIMENT I

A key aspect of the present invention deals with the ring-opening of the benzocyclobutene monomers to reactive o-quinodimethanes. In this embodiment, half-life values for the parent benzocyclobutene are calculated and summarized in the following Table 1, based on activation parameters reported in W. R. Roth et al, Chem. Ber. 111, 3892-3903 (1978). The results suggest that reactive oligomers and polymers containing benzocyclobutenes which are not substituted at the cyclobutene ring would have long shelf-life and good reactivity at >200.

TABLE 1

| T (°C.) | k Benzocyclobutene → o-quinodimethane | |
| --- | --- | --- |
|  | k (sec$^{-1}$) | t$_{\frac{1}{2}}$ (hr) |
| 25 | $2.5 \times 10^{15}$ | $7.6 \times 10^{10}$ |

TABLE 1-continued

| T (°C.) | k Benzocyclobutene → o-quinodimethane | |
| --- | --- | --- |
|  | k (sec$^{-1}$) | t$_{\frac{1}{2}}$ (hr) |
| 100 | $1.7 \times 10^{-9}$ | $1.1 \times 10^5$ |
| 150 | $9.6 \times 10^{-7}$ | $2 \times 10^2$ |
| 200 | $1.4 \times 10^{-4}$ | 1.4 |
| 250 | $7.8 \times 10^{-3}$ | $2.5 \times 10^{-2}$ |

ILLUSTRATIVE EMBODIMENT II

Preparation of 4-vinylbenzocyclobutene

A solution of 4-chloromethylbenzocyclobutene (24.4 g, 160 mmol) and triphenylphosphine (41.9 g, 160 mmol) in 120 ml of chloroform was heated at reflux for 24 h. Addition of diethyl ether followed by filtration gave tripheny(4-benzocyclobutenyl)methyl phosphonium chloride as a white powder: $^1$H NMR (CDCl$_3$) δ3.03 (m, 4H), 5.36 (d, 2H), 6.82 (m, 3H), 7.6-7.8 (m, 15H). To a solution of the phosphonium salt in 500 ml of 37% formaldehyde in water was added dropwise 75 ml of 50% aqueous sodium hydroxide. The mixture was stirred at ambient temperature for 2 h and then extracted with diethyl ether. The ether extract was washed with brine and dried over magnesium sulfate. Fractional distillation gave 14.5 g of 90% pure 4-vinylbenzocyclobutene: bp 63°-66° C. (6 torr); $^1$H NMR (CDCl$_3$) δ3.11 (s, 4H), 5.11 (d, 1H), 5.63 (d, 1H), 6.66 (dd, 1H), 6.95 (d, 1H), 7.10 (s, 1H), 7.18 (d, 1H); $^{13}$C NMR (CDCl$_3$) δ29.29, 29.44, 112.27, 119.87, 122.52, 125.70, 136.72, 137.97, 146.66. 146.01.

ILLUSTRATIVE EMBODIMENT III

Free radical copolymerization of styrene and 4-vinylbenzocyclobutene

A mixture of styrene (5 g, 48 mmol), 4-vinylbenzocyclobutene (0.1 g, 0.77 mmol) and benzoyl peroxide (0.11 g) was heated under inert atmosphere for 2 days at 50° C. and 1 day at 60° C. The resulting solid plug was dissolved in toluene and reprecipitated from methanol. The precipitate was collected by vacuum filtration and dried at 70° C. in vacuo to give 4.56 g of a white powder. NMR analysis of the product showed the presence of characteristic $^{13}$C and $^1$H resonances of benzocyclobutene at δ29.24 and 3.1, respectively. The product was estimated to contain 1-2%m of 4-vinylbenzocyclobutene based on NMR integration. Compression molding of the copolymer at 150° C. gave a film which was soluble in toluene, whereas a film of the copolymer prepared by molding at 200° C. for 17 h was insoluble in toluene, methylene chloride or tetrahydrofuran.

ILLUSTRATIVE EMBODIMENT IV

Anionic copolymerization of 4-vinylbenzocyclobutene and styrene

To a slution of 4-vinylbenzocyclobutene (0.45 g, 3.5 mmol), styrene (26.7 g, 257 mmol), 200 μl of 1-n-butoxy-2-t-butoxyethane in 233 g of cyclohexane was added 0.84 mmol of s-butyl lithium. After heating at 50° C. for 2 h under an inert atmosphere, the polymerization was terminated by the addition of 3 ml of 1% w Ionol in methanol. The product was isolated by precipitation from methanol and dried in vacuo at 80° C. to give 26 g of a white, brittle solid. The polymer was shown by $^1$H NMR to contain 1.2%m of 4-vinylbenzocyclobutene based on the benzocyclobutene reso-

What is claimed is:

1. A solid random copolymer comprising from about 99.99 to about 80 mole percent of a monoalkenyl arene monomer and from about 0.01 to about 20 mole percent, based on total moles of incorporated monoalkyl arene and olefinic benzocyclobutene monomers, of an olefinic benzocyclobutene monomer of the formula:

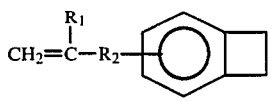

where $R_1$ is hydrogen or $CH_3$ and $R_2$ is $(CH_2)_n$ where n is 0 to 6.

2. The copolymer of claim 1 wherein the olefinic benzocyclobutene content is between about 0.1 and about 10 mole percent.

3. The copolymer of claim 1 wherein said olefinic benzocyclobutene monomer is selected from the group consisting of:
   4-(3-butenyl)benzocyclobutene
   3-(3-butenyl)benzocyclobutene
   4-allylbenzocyclobutene
   3-allylbenzocyclobutene
   4-vinylbenzocyclobutene, and
   3-vinylbenzocyclobutene.

4. The copolymer of claim 1 wherein $R_1$ is hydrogen and n is 0 to 2.

5. The copolymer of claim 1 wherein said olefinic benzocyclobutene monomer is 4-vinylbenzocyclobutene.

6. The copolymer of claim 1 wherein said monoalkenyl arene is selected from the group consisting of styrene, p-methylstyrene and α-methylstyrene.

7. The copolymer of claim 1 wherein said monoalkenyl arene is styrene.

8. The copolymer of claim 1 also containing a third copolymerizable vinyl monomer.

9. The copolymer of claim 8 wherein said third copolymerizable vinyl monomer is selected from the group consisting of methyl acrylate, ethyl acrylate, methyl methacrylate, acrylonitrile, butadiene, isoprene and chloroprene.

10. A solid graft copolymer comprising from about 99.99 to about 80 mole percent of a monoalkenyl arene monomer, from about 0.01 to about 20 mole percent, based on total moles of incorporated monoalkyl arene and olefinic benzocyclobutene monomers, of an olefinic benzocyclobutene monomer of the formula

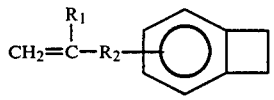

where $R_1$ is hydrogen or $C_3$ and $R_2$ is $(CH_2)_n$ where n is 0 to 6, and a rubber backbone polymer.

11. The graft copolymer of claim 10 wherein said backbone polymer is polybutadiene.

12. A solid copolymer having increased molecular weight or crosslinking prepared by heating the copolymer of claim 1 to a temperature above about 200° C.

13. A process for preparing a solid polymer comprising copolymerizing from about 99.99 to about 80 mole percent, based on total moles of incorporated monoalkenyl arene and olefinic benzocyclobutene monomers, of a monoalkenyl arene monomer and from about 0.01 to about 20 mole percent of an olefinic benzocyclobutene monomer of the formula:

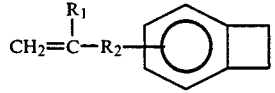

where $R_1$ is hydrogen or $CH_3$ and $R_2$ is $(CH_2)_n$ where n is 0 to 6, in the presence of a catalyst at a temperature between about $-80°$ C. and $+150°$ C.

14. The process of claim 13 wherein said olefinic benzocyclobutene monomer is selected from the group consisting of:
   4-(3-butenyl)benzocyclobutene
   3-(3-butenyl)benzocyclobutene
   4-allylbenzocyclobutene
   3-allylbenzocyclobutene
   4-vinylbenzocyclobutene, and
   3-vinylbenzocyclobutene.

15. The process of claim 13 wherein said olefinic benzocyclobutene monomer is 4-vinylbenzocyclobutene.

16. The process of claim 13 wherein said catalyst is a free radical catalyst.

17. The process of claim 13 wherein said catalyst is an anionic catalyst.

18. A solid random copolymer according to claim 1 which contains unsubstituted cyclobutene rings.

19. A solid random copolymer according to claim 1 which is thermally crosslinkable through unsubstituted cyclobutene rings.

* * * * *